Figure 1:
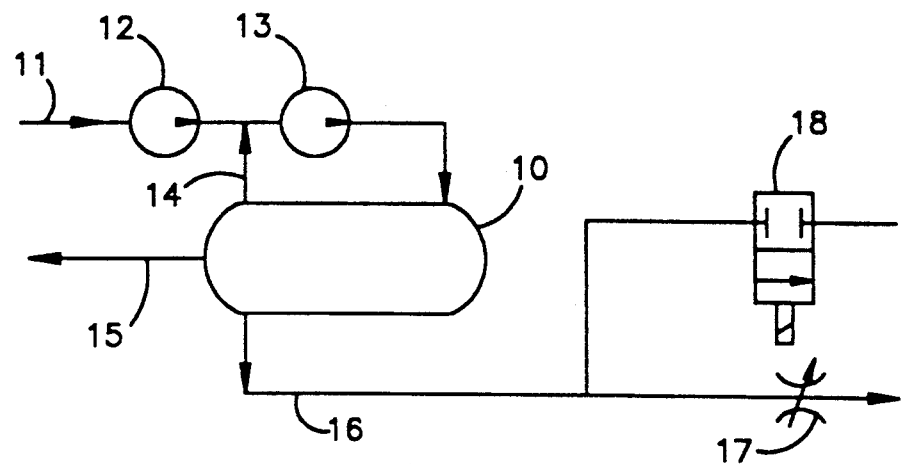

United States Patent
Dellby et al.

[11] Patent Number: 5,284,424
[45] Date of Patent: Feb. 8, 1994

[54] OSMOTIC WATER PURIFICATION PUMPING SYSTEM WITH FLUSH VALVE

[75] Inventors: Fredrik Dellby, Enskede; Per A. Fonser, Stockholm; Peter H. Hagqvist, Älvsjö, all of Sweden

[73] Assignee: Aktiebolaget Electrolux, Sweden

[21] Appl. No.: 998,431

[22] Filed: Dec. 30, 1992

[30] Foreign Application Priority Data

Jan. 16, 1992 [SE] Sweden ............... 9200120-5

[51] Int. Cl.⁵ ................................ F04B 23/14
[52] U.S. Cl. ..................... 417/201; 417/205; 417/214; 417/440
[58] Field of Search ............. 210/416.2, 416.3, 167, 210/169, 195.1, 195.2, 425, 426, 427; 417/214, 440, 201, 205

[56] References Cited

U.S. PATENT DOCUMENTS

| | | | |
|---|---|---|---|
| 3,747,763 | 7/1973 | Kain | 210/181 |
| 3,907,686 | 9/1975 | Fletcher et al. | 210/425 |
| 4,115,276 | 9/1978 | Kelly | 210/425 |
| 4,367,140 | 1/1983 | Wilson | 417/377 |
| 4,759,846 | 7/1988 | MacFarlane | 210/427 |
| 5,203,803 | 4/1993 | Schoenmeyr | 417/38 |

FOREIGN PATENT DOCUMENTS 1308778 5/1987 U.S.S.R. ............... 417/440

Primary Examiner—Richard A. Bertsch
Assistant Examiner—Roland G. McAndrews, Jr.
Attorney, Agent, or Firm—Pearne, Gordon, McCoy & Granger

[57] ABSTRACT

The invention relates to a pump arrangement, especially for the operation of an osmotic water purifier comprising a filter housing (10) having a raw water inlet (11), a filtrate outlet (15), a reject outlet (16), and a flush valve (18) adapted to be opened for flushing raw water through the filter housing. The pump arrangement comprises a high pressure pump (12) for supplying raw water at the required pressure, and a circulation pump (13) for recirculating a relatively large flow through the filter housing. The high pressure pump (12) consists of a sliding vane pump of the type in which the vanes (24) are caused to sealingly engage the surrounding wall of the pump chamber by a hycraulic pressure supplied from the pressure side of the high pressure pump. The inlet of the high pressure pump is connected to a pressurized water supply line, whereby, when the flush valve (18) is opened and said pressure ceases, said vanes are moved radially inwards and the high pressure pump is opened for allowing a through flow exceeding its normal capacity.

3 Claims, 3 Drawing Sheets

OSMOTIC WATER PURIFICATION PUMPING SYSTEM WITH FLUSH VALVE

The present invention relates to a pump arrangement, especially for the operation of an osmotic water purifier comprising a filter housing having a raw water inlet, a filtrate outlet, a reject outlet, and a flush valve adapted to be opened for flushing raw water through the filter housing, said pump arrangement comprising a high pressure pump for supplying raw water at a pressure required for the osmotic process, and a circulation pump which during normal operation recirculates a relatively large flow through the filter housing.

In such a purifier, in order to keep the consumption of raw water at a low level it is necessary that the flow of reject water is relatively small. In operation, impurities will therefore be concentrated in the filter housing and to avoid too high such concentration the filter housing should be flushed through with raw water at certain intervals. In order to obtain an efficient cleaning of the filter surface by such flushing, a large flow is required. This can be obtained by opening the flushing valve whereby the pressure in the filter housing drops to approximately zero, which makes it possible to supply a large flow of raw water from feed line of the high pressure pump. In order to prevent the low capacity high pressure pump from throttling the flow it must have a by-pass line which is opened by a valve. The circulation pump continues to circulate water through the filter housing even during the flushing phase in order to provide the best possible flushing for cleaning the filter surface.

The object of the invention is to provide a pump arrangement which has a simpler and more compact construction in that the by-pass line of the high pressure pump can be dispensed with and which simplifies the control of the flushing procedure in that it is necessary to adjust one valve only. This has been achieved by means of a pump arrangement of the kind mentioned in the introduction which according to the invention is characterized in that the high pressure pump is a sliding vane pump of the type in which the vanes are caused to sealingly engage the surrounding wall of the pump chamber by a hycraulic pressure supplied from the pressure side of the high pressure pump, the inlet of said high pressure pump being connected to a pressurized water supply line, whereby, when said flush valve is opened and said pressure ceases, said vanes are moved radially inwards and the high pressure pump is opened for allowing a through flow exceeding its normal capacity.

Figure 2:
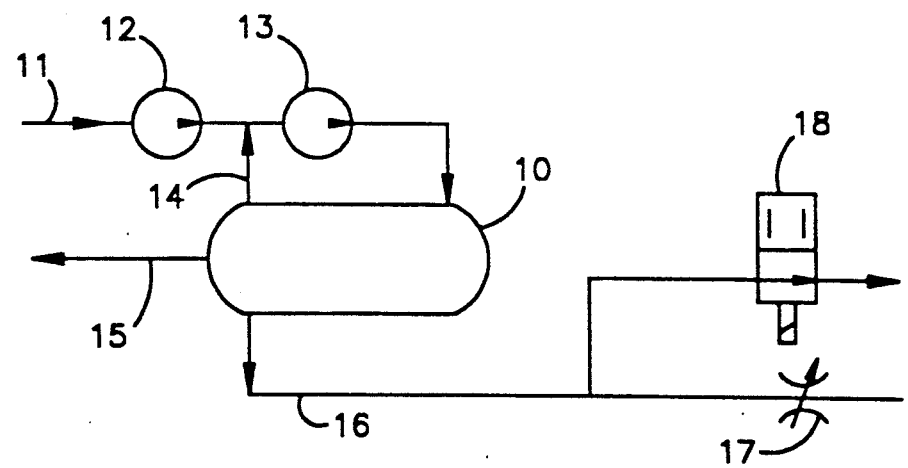
Figure 3:
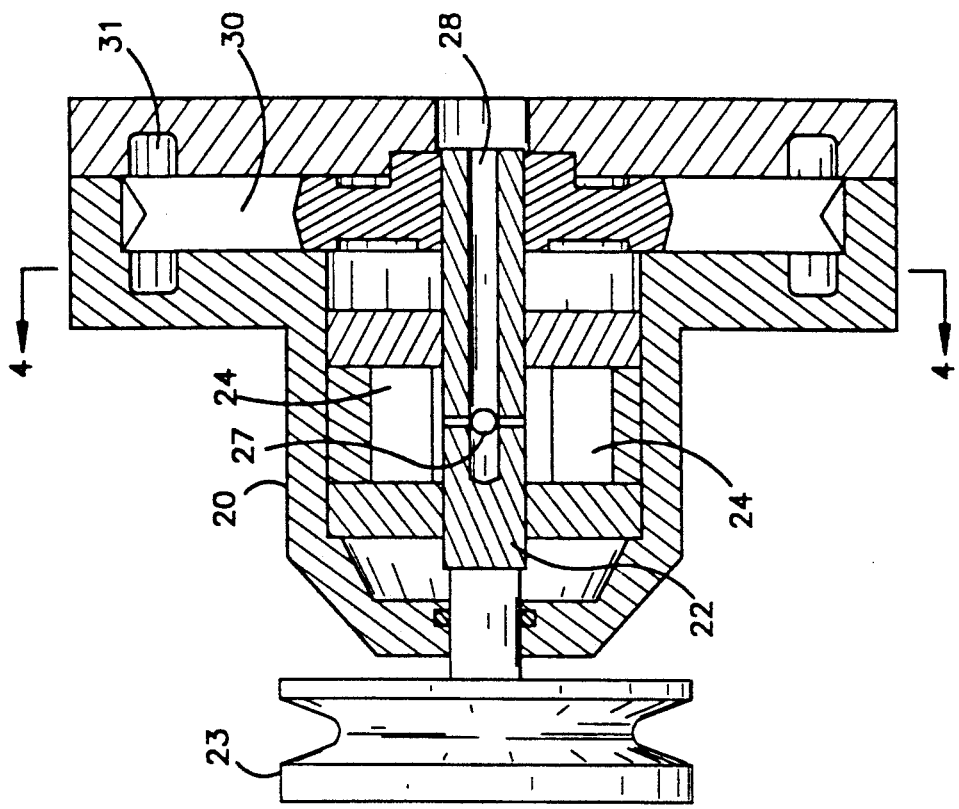
Figure 4:
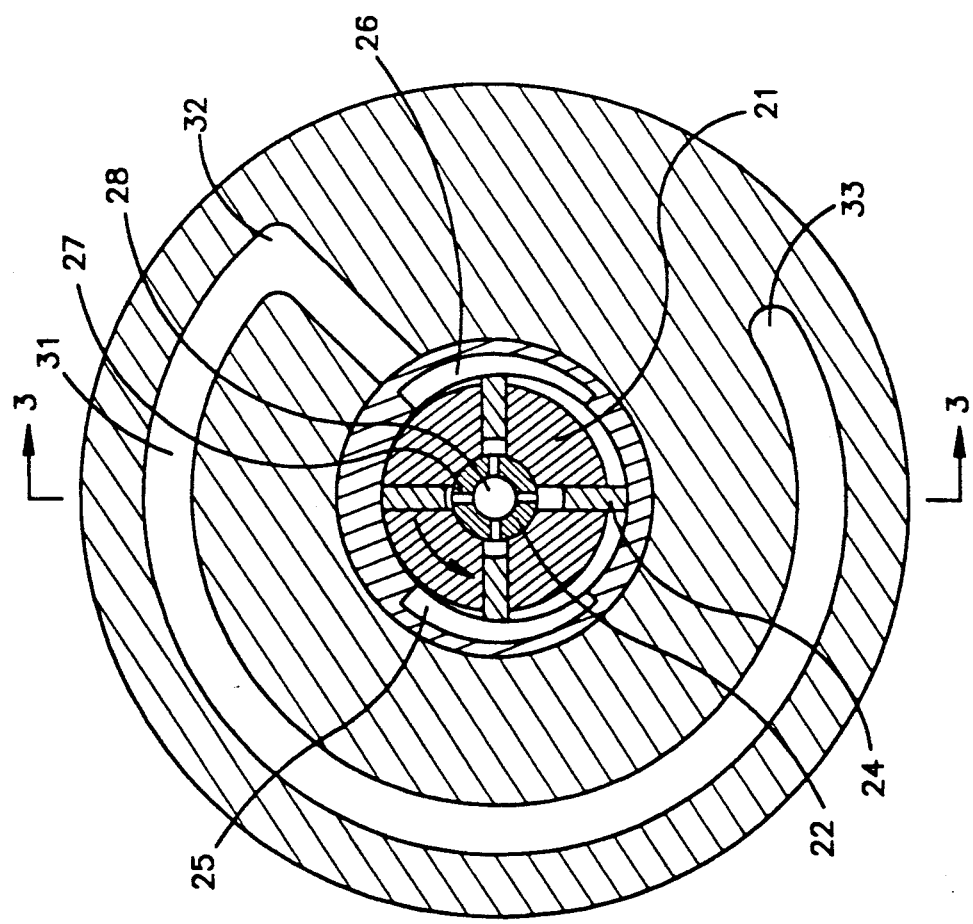
Figure 5:
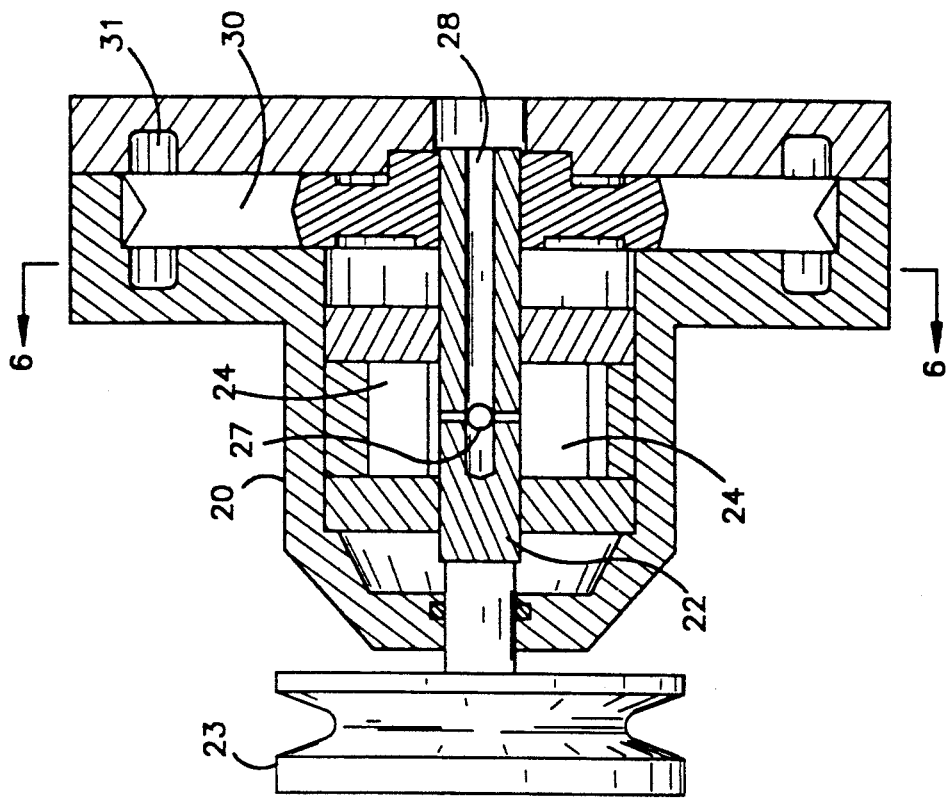
Figure 6:
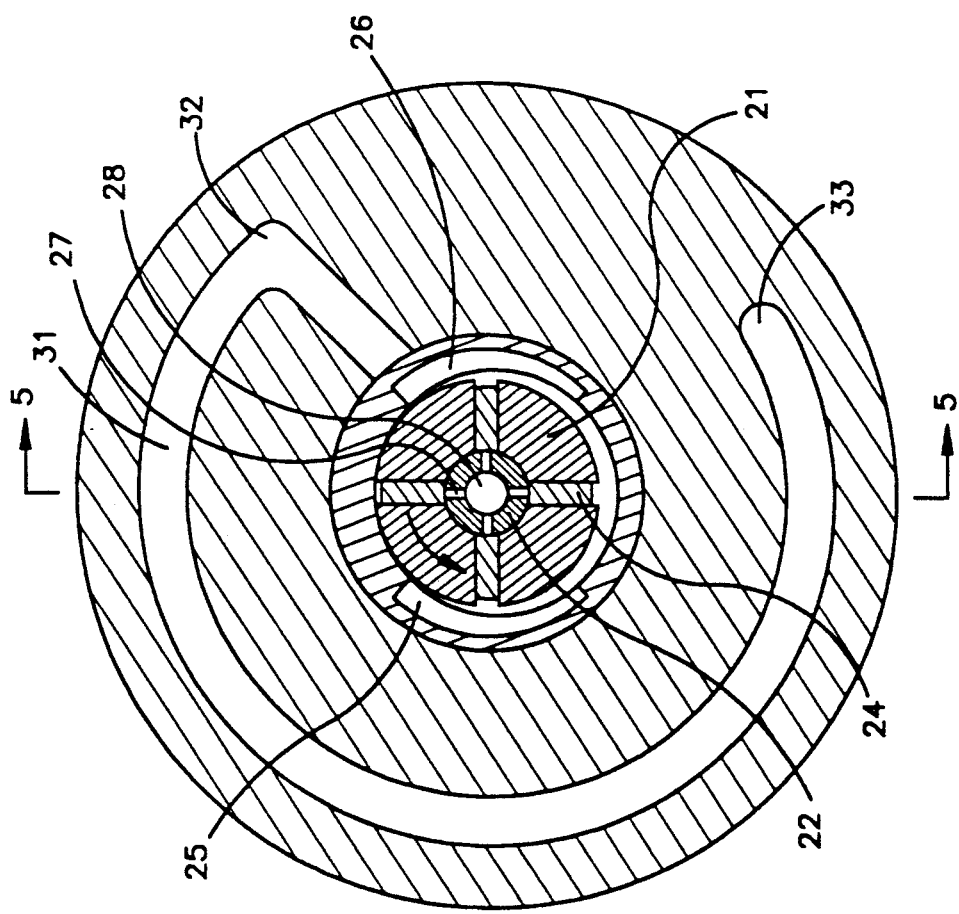

The invention will be described in more detail with reference to the accompanying drawings, in which FIG. 1 is a diagrammatic view of a water purifier in operating position, FIG. 2 shows the same water purifier in a flushing position, FIG. 3 is a longitudinal section taken along line III—III in FIG. 4 of the pump arrangement according to the invention in operating position, FIG. 4 is a cross-section taken along line IV—IV in FIG. 3, and FIGS. 5 and 6 are corresponding views of the pump arrangement in flushing position.

The water purifier illustrated in FIG. 1 comprises a filter housing 10 in the form of a pressure vessel containing an osmotic filter (not shown). Raw water is supplied via an inlet 11 and a high pressure pump 12 which is connected in series with a circulation pump 13. A return line 14 from the filter housing is connected to the inlet at a position between the two pumps 12, 13 to form a circulation circuit through which a large flow is recirculated for preventing clogging of the filter. Furthermore, the filter housing has a filtrate outlet 15 for purified water and a reject outlet 16 proveded with a pressure control valve 17 and a flush valve 18 arranged in parallel therewith.

In FIG. 1 the purifier is shown in normal operation, in which the pressure required for the process is provided by the high pressure pump 12, said pressure being maintained at the correct level by the control valve 17. The flush valve 18 is closed. A portion of the amount of water supplied via the inlet 11 is discharged as purified water via the filtrate outlet 15 and the rest is discharged as reject water via the control valve 17.

For the flushing operation, the flush valve 18 is opened which causes the pressure of the system to drop to approximately zero. A large flow of raw water is supplied via the inlet 11 and this flow is discharged entirely through the flush valve. Even in this stage the circulation pump continues to recirculate water through the filter housing to provide an efficient flushing for cleaning the filter.

The pump design is shown in more detail in FIGS. 3–6 in which both pumps are provided in a common pump housing 20. The high pressure pump comprised a sliding vane pump having a rotor 21 mounted on a shaft 22 driven by a motor (not shown) via a pulley 23. The rotor 21 is provided with four vanes 24 which during rotation of the rotor pump water from the inlet 25 of the pump to the outlet 26 thereof (FIGS. 3 and 4). The pump is of the type in which the vanes are caused to sealingly engage the surrounding cylinder wall by the hydraulic pressure from the pressure side of the pump acting on the inner end face of the vanes. To this end the shaft 22 is provided at a position opposite to the vanes 24 with radial borings 27 opening into an axial boring 28 in the shaft. The boring 28 extends to one end of the shaft and is connected to the filter housing 10 and consequently exposed to the pressure prevailing therein.

In the shown example, the circulation pump is a so-called side channel pump the impeller 30 of which is attached to the shaft 22 at one end thereof. Both pumps thus have a common shaft and are driven by the same motor. The impeller 30 cooperates with a channel 31 extending along the major portion of the circumference on both sides of the impeller and having an inlet end 32 and an outlet end 33. The inlet 32 is connected to the outlet 26 of the sliding vane pump as well as to the return line 14 from the filter housing, and the outlet 33 of the channel is connected to the inlet of the filter housing 10.

FIGS. 3 and 4 illustrate the pump unit in operating position. The high pressure pump, the inlet of which is connected to a pressurized water supply line, supplies raw water at required pressure which is controlled by the control valve 17. This pressure is transmitted via the boring 28 of the shaft 22 and the borings 27 to the inner end faces of the vanes 24 whereby the vanes are pushed radially outwards to sealingly engage the surrounding cylindrical wall of the pump housing. When the flush valve 18 is opened (FIG. 2) the overpressure in the filter housing drops to approximately zero whereby the radial force on the vanes 24 ceases. The overpressure at the inlet of the pump will then actuate the vanes in the opposite direction, i.e. radially inwards, whereby they are adjusted to the position shown in FIGS. 5 and 6. A free passage is thereby opened through the pump from its inlet 25 to its outlet 26, as is best seen in FIG. 6.

In the position shown in FIGS. 5 and 6 the high pressure pump does not prevent the supply of a large flow of raw water via the inlet 11, said flow passing through the filter housing and being discharged via the reject outlet 16 and the flush valve 18. The circulation pump 13 continues to recirculate liquid even during the flushing procedure in order to maintain a high flow velocity through the filter housing and thereby provide the best possible flushing for cleaning of the filter.

It appears from the above that the flushing procedure can be performed in a very simple manner. The only measure required is to open the flush valve 18 which causes the high pressure pump 12 to adjust automatically to flushing position. In addition, the high pressure pump does not require the provision of a by-pass line with appurtenant valve which simplifies the design.

We claim:

1. Pump arrangement, especially for the operation of an osmotic water purifier comprising a filter housing (10) having a raw water inlet (11), a filtrate outlet (15), a reject outlet (16), and a flush valve (18) adapted to be opened for flushing raw water through the filter housing, said pump arrangement comprising a high pressure pump (12) for supplying raw water at a pressure required for an osmotic process, and a circulation pump (13) which during normal operation recirculates a relatively large flow through the filter housing, characterized in that the high pressure pump (12) is a sliding vane pump of the type in which the vanes (24) are caused to sealingly engage a surrounding wall of the pump chamber by a hydraulic pressure supplied from a pressure side of the high pressure pump, an inlet of said high pressure pump being connected to a pressurized water supply line, whereby, when said flush value (18) is opened said hydraulic pressure ceases, said vanes are moved radially inwards and the high pressure pump is opened for allowing a through flow exeeding its normal capacity.

2. Pump arrangement according to claim 1, characterized in that the high pressure pump (12) and the circulation pump (13) are attached to a common shaft (22) and driven by a same motor.

3. Pump arrangement according to claim 1 or 2, characterized in that the circulation pump (13) is a side channel pump.

* * * * *